United States Patent [19]

Lemay et al.

[11] Patent Number: 5,161,217
[45] Date of Patent: Nov. 3, 1992

[54] BUFFERED ADDRESS STACK REGISTER WITH PARALLEL INPUT REGISTERS AND OVERFLOW PROTECTION

[75] Inventors: Richard A. Lemay, Carlisle; Steven A. Tague, Billerica; Kenneth J. Izbicki, Hudson; William E. Woods, Natick, all of Mass.

[73] Assignee: Bull HN Information Systems Inc., Billerica, Mass.

[21] Appl. No.: 418,084

[22] Filed: Oct. 6, 1989

Related U.S. Application Data

[63] Continuation of Ser. No. 300,732, Jan. 23, 1989, abandoned, and a continuation of Ser. No. 918,227, Oct. 14, 1986, abandoned.

[51] Int. Cl.⁵ ........................ G06F 9/22; G06F 12/00
[52] U.S. Cl. ........................ 395/375; 364/DIG. 1; 364/238.6; 364/247; 395/400; 395/425
[58] Field of Search ... 364/200 MS File, 900 MS File, 364/736; 395/400, 425, 375

[56] References Cited

U.S. PATENT DOCUMENTS

| | | | |
|---|---|---|---|
| 3,903,509 | 9/1975 | Picandet | 395/250 |
| 4,031,520 | 6/1977 | Robner | 364/900 |
| 4,334,269 | 6/1982 | Shibasaki et al. | 364/200 |
| 4,352,157 | 9/1982 | Namimoto et al. | 364/200 |
| 4,399,507 | 8/1983 | Cosgrove et al. | 364/200 |
| 4,405,983 | 9/1983 | Perez-Mendez | 364/200 |
| 4,438,492 | 3/1984 | Harmon, Jr. et al. | 364/200 |
| 4,488,227 | 12/1984 | Miu et al. | 364/200 |
| 4,530,049 | 7/1985 | Zee | 364/200 |
| 4,546,431 | 10/1985 | Horvath | 364/200 |
| 4,628,477 | 12/1986 | Burrows | 364/900 |
| 4,835,738 | 5/1989 | Niehaus et al. | 364/900 |

Primary Examiner—Thomas C. Lee
Assistant Examiner—Mehmet Geckil
Attorney, Agent, or Firm—John S. Solakian

[57] ABSTRACT

A last-in, first-out register having multiple address input ports and capable of storing a plurality of addresses. Address loading operations are over-lapped with address reading operations to speed up the rate at which addresses may be stored in and retrieved from the register. When the register is full of addresses it provides an indication which permits: the addresses already stored in the register to be read out and stored in an external memory, then additional addresses to be stored in the register, and subsequently the addresses transferred to the memory for storage to be retransferred to the buffer address register for read out.

4 Claims, 4 Drawing Sheets

BUFFERED ADDRESS STACK REGISTER WITH PARALLEL INPUT REGISTERS AND OVERFLOW PROTECTION

FIELD OF THE INVENTION

This invention relates to address registers used in computer systems.

BACKGROUND OF THE INVENTION

Buffer address registers that can store multiple addresses are well known in the prior art. They are typically used to temporarily store one or more addresses used to read computer program instructions or subroutines out of a memory, and they have two basic types of operation. There is the first-in, first-out buffer address register which stores one or more sequentially received addresses that are read out such that an address stored therein the longest is the first to be read out. The other basic type is the last-in, first-out buffer register which also stores one or more sequentially received addresses that are read out such that the most recently received and stored address is the first to read out. These registers are known in the art as pop-stack registers.

There are inherent problems in these prior art buffer address registers. One problem that contributes to limiting the speed of operation of the register is that an address loading operation must be completely performed before an address reading operation can be performed. Another inherent problem is due to these prior art buffer address registers only having a single address input which requires a multiplexing scheme to input addresses to the register from multiple sources.

SUMMARY OF THE INVENTION

The above enumerated and other problems of prior art buffer address registers are solved by the present invention. The buffer address register of the present invention is a last-in, first-out register typically capable of buffer storage of seventeen addresses. In addition, the novel buffer address register has multiple address input ports, the number of which can be easily changed. Further, address loading operations are over-lapped with address reading operations to speed up the rate at which addresses may be stored in and retrieved from the present novel buffer address register. In addition, when the buffer register is full of addresses and more addresses are to be stored before readout of addresses, the addresses already stored in the buffer register are read out and stored in an external memory and then additional addresses are stored in the buffer register. When the additional addresses are read out and the register is empty, the addresses transferred to the memory for storage are retransferred to the buffer address register and read out.

BRIEF DESCRIPTION OF THE DRAWING

The operation of the present invention will be better understood upon reading the following detailed description in conjunction with the drawing in which.

DESCRIPTION OF THE PREFERRED EMBODIMENT

Figure 1:
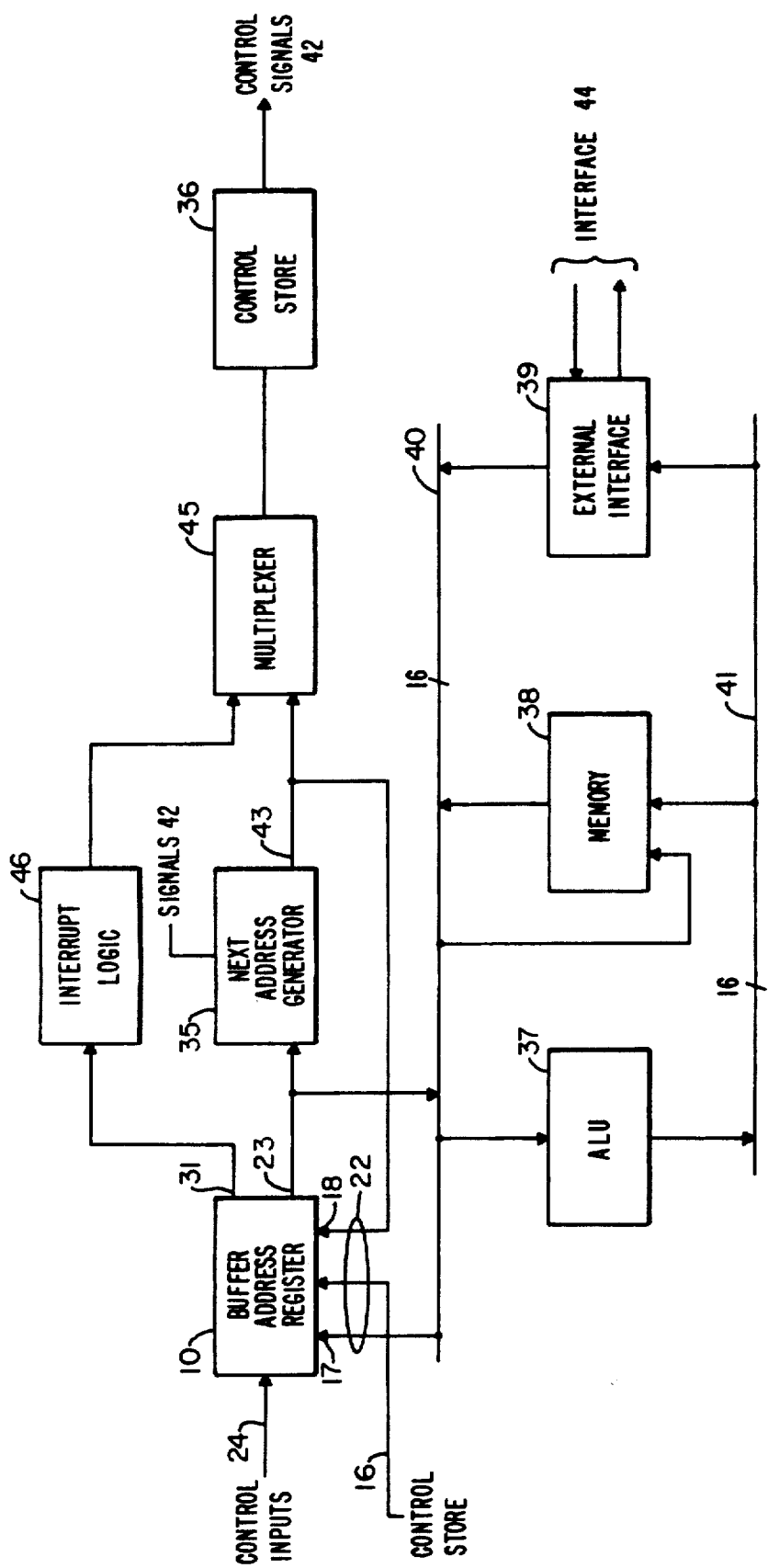
FIG. 1 is a block diagram of a part of a computer system in which the present invention is used.

In FIG. 1 is shown a block diagram of a part of a computer system in which the novel buffer address register 10 is used. More details of a computer system utilizing stack registers and with which the present invention may be utilized is shown in U.S. Pat. No. 4,488,227. Register 10 has addresses applied to address inputs 16 and 17 and to interrupt address input 18, which are collectively called address inputs 22. Register 10 also has an overflow/underflow indicator output 31 which indicates when register 10 is full, almost full, or empty of addresses. Also, register 10 has an address output 23 on which are addresses read out of register 10. Addresses are applied to address input 16 from the control store 36, and to input 17 from different sources via a sixteen bit bus 40 under control of PUSH and POP signals which are part of the control signals 42 output from control store 36 in a manner well known in the art. The PUSH and POP signals are described in greater detail hereinafter with reference to FIG. 2 which is a detailed block diagram of the novel buffer address register 10. Control connections between control store 36 and the other circuits in FIG. 1 are not shown since they are known in the art and to avoid cluttering up the drawing.

Addresses read out of register 10 on address output 23 are input to next address generator 35 which responds thereto to generate addresses on output 43 which are then applied to control store 36 via multiplexer 45 and to interrupt input 18 of buffer address register 10. Next address generator 35 also provides addresses at its output in response to other inputs (not shown) when it is not responding to an input from buffer address register 10. There is also the overflow/underflow indicator output 31 to interrupt logic circuit 46 which also generates signals via multiplexer 45 to control store 36. Multiplexer 45 applies either the output from next address generator 35 or the output from interrupt logic circuit 46 to control store 36.

Control store 36 is responsive to the addresses output from multiplexer 45 to generate control signals 42 which will read out data, addresses or instructions stored in memory 38. Data read out of memory 38 can be input via bus 40 to arithmetic logic unit (ALU) 37. Results output from ALU 37 are applied via bus 41 to either memory 38 to be stored therein, or may be passed via external interface 39 and interface 44 to other circuits not shown in FIG. 1. Data and instructions may also be received from other circuits (not shown) via interface 44, external interface 39 and bus 40.

Figure 2:
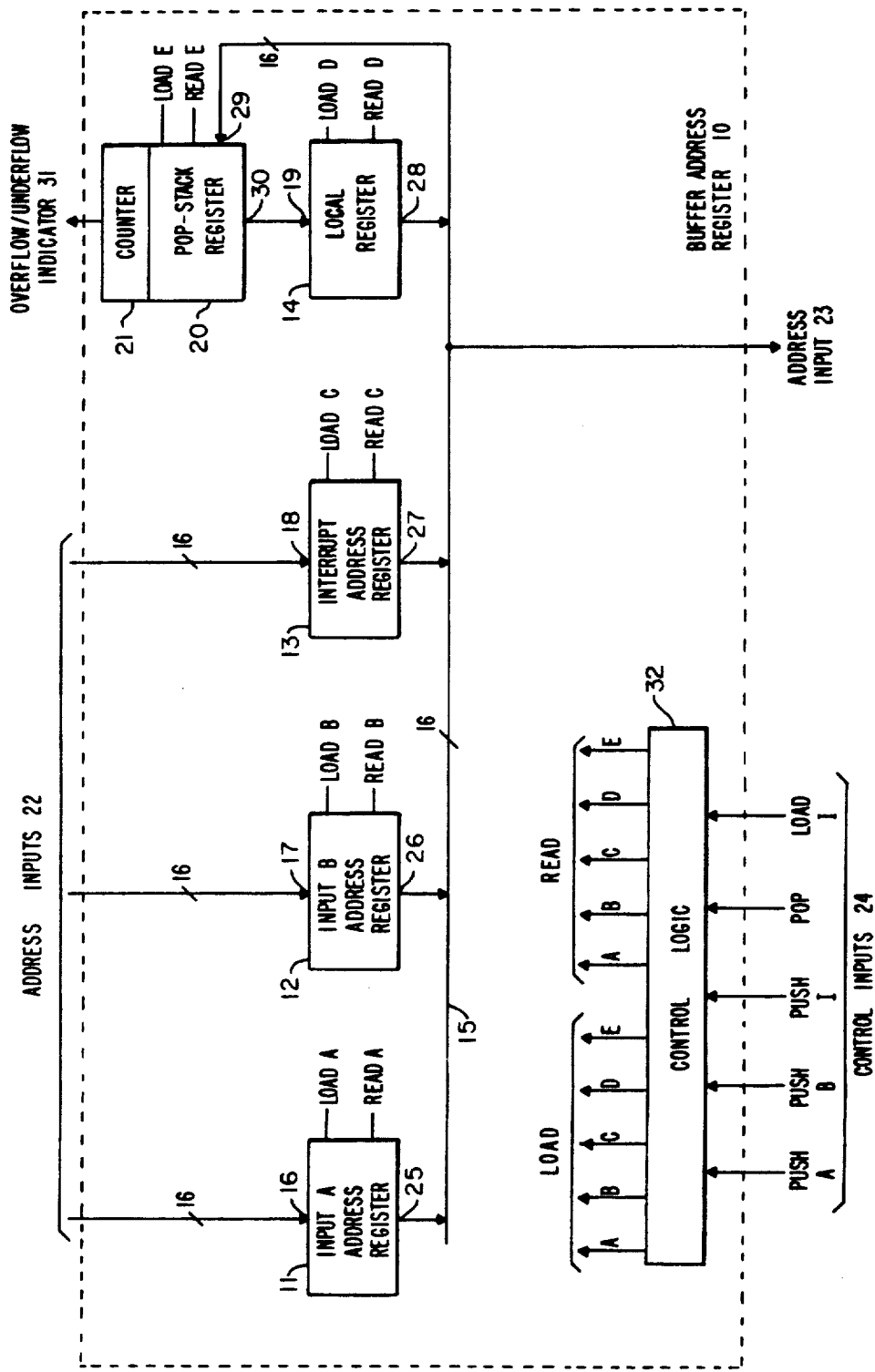
FIG. 2 is a detailed block diagram of the novel buffer address register.

In FIG. 2 is shown a detailed block diagram of the novel buffer address register 10 which operates as a last-in, first out pop-stack register. The preferred embodiment of the novel buffer address register disclosed herein is comprised of three input address registers 11, 12, and 13 (Input A, Input B, and Interrupt), each of which can store a sixteen bit address. Address registers 11, 12 and 13 have respective inputs 16, 17 and 18 which make up the three input ports of address inputs 22 via which addresses are input to buffer address register 10 from different sources. The respective outputs 25, 26, and 27 of input address registers 11, 12 and 13 are connected to sixteen bit bus 15.

While three input address registers 11, 12 and 13 are shown, one skilled in the art can easily expand or contract the number of input address registers to meet a particular need. Registers 11, 12 and 13 each has a respective LOAD (A, B or C) input control lead which when energized will cause a sixteen bit binary word (address) at their respective inputs 16, 17 and 18 to be stored in the registers. Registers 11, 12 and 13 also each have a respective READ (A, B or C) output control lead which when energized will cause the sixteen bit binary word stored in the registers to be read out via their respective outputs 25, 26 and 27 onto sixteen bit bus 15. An address is normally stored in only one of input registers 11, 12 or 13 at a time in the preferred embodiment of the invention. After an address is stored in one of input address registers 11, 12 or 13, as just described, it is read out onto bus 15 by enabling the READ (A, B or C) output control lead of the particular one of registers 11, 12 or 13 in which it is stored. The address read out from one of registers 11, 12 or 13 can either be stored in pop-stack register 20, or can be output from buffer address register 10 via address output 23 to external circuitry (not shown in FIG. 2, but generally shown in FIG. 1) which uses the address read out to read one or a group of program instructions out of a memory 38 (FIG. 1) in the computer system in which the novel buffer address register is functioning. This external circuitry (not shown in FIG. 2) is typically a next address generator 35 which is not part of the invention.

In FIG. 2 the LOAD (A through E) input control and READ (A through E) output control leads to registers 11 through 14 and 20 are those leads that make up the output leads of the same designation from control logic circuit 32. They are not shown connected to registers 11 through 14 and 20 to avoid cluttering up FIG. 2. The operation of registers 11 through 14 and 20 is controlled by control logic circuit 32 in response to PUSH, POP and LOAD I command inputs as described further in this specification with reference to FIGS. 3 and 4.

Input A address register 11 and Input B address register 12 store addresses from two sources in a computer system (not shown in FIG. 2) with which the novel buffer address register 10 functions. Interrupt address register 13 is used to store interrupt addresses. When a hardware error is detected by other circuitry (not shown) in the computer system, processing is immediately stopped and the address (interrupt) at which processing is to resume is stored in interrupt address register 13. When the error is corrected the interrupt address is retrieved from buffer address register 10 and used to continue the interrupted processing.

Local register 14 is the same kind of register as registers 11, 12 and 13, but is not used as an input register. The sixteen bit input 19 of local register 14 is connected to output 30 of a conventional pop-stack register 20, and the output 28 of local register 14 is connected to bus 15. Local register 14 has a LOAD D input control lead and a READ D output control lead that function in the same manner as the READ and LOAD leads (A through C) for input address registers 11, 12, and 13. The operation of local register 14 is described in greater detail further in this specification.

Register 20 is a conventional pop-stack register that can hold sixteen addresses of sixteen bits apiece and operates on a last-in, first-out basis. Register 20 has an input 29 and addresses on bus 15 are selectively stored in register 20 by energizing its LOAD E input control lead. Addresses stored in pop-stack register 20 are read out by energizing its READ E output control lead. The function of pop-stack register 20 and is described in greater detail further in this specification.

Connected to pop-stack address register 20 is a counter 21 which is incremented each time an address is stored in register 20 and is decremented each time an address is removed from register 20. The count at any time in counter 21 serves as an address to indicate at which address locations in pop-stack register 20 addresses should be stored. When counter 21 has a count of zero it addresses the first address location in register 20. When one address is stored in register 20 and counter 21 is incremented to the count of one, the second address location in register 20 is addressed, and so on. When sixteen words are stored in register 20 the count in counter 21 is sixteen which also provides an output on overflow indicator 31 to indicate that register 20 is full. Alternatively, counter 21 can be modified to indicate an underflow condition and/or an impending overflow/ underflow condition.

In operation not all inputs to next address register 35 (connected to address output 23) are from buffer address register 10, yet there is an address output from register 35 for every machine cycle of the computer system in which the equipment shown in FIG. 1 is located. When an address output from register 35 is not caused by a POP operation of register 10, and the next operation is a PUSH which causes an impending overflow indication, the address output from register 35 must be saved until after an interrupt has been processed to handle the impending overflow from register 10.

In the following paragraphs is described the operation of buffer address register 10 for different sequences of loading and reading addresses. These described sequences, in conjunction with the above descriptions and the descriptions of the logic diagrams in FIGS. 3 and 4 hereinafter, enable the reader to understand the operation of buffer address register 10 sufficiently so that the reader will understand how register 10 will perform for other sequences of operations.

In the simplest operation of buffer address register 10 addresses are input to and output from register 10 at the same rate. As a sixteen bit address is stored in one of input registers 11, 12 and 13 it is read out to address output 23 before another address is stored in one of input registers 11, 12 or 13. Control logic circuit 32 which is described further in this specification enables the LOAD (A through C) input control lead of one of input registers 11, 12 or 13 at a time. After an address is stored in one of input address registers 11, 12 or 13, as just described, it is read out onto bus 15 by enabling the READ (A through C) output control lead of the register in which it is stored. In this manner, as an address is stored it is read out before another address is stored in one of registers 11, 12 or 13. With this simple operation no addresses are stored in pop-stack register 20 or local register 14.

In a more normal operation a first address is already stored in one of input registers 11, 12 or 13 as described in the last paragraph. Then a second address is to be stored in one of input registers 11, 12 or 13 before the previously stored first address has been read out via bus 15 to address output 23. The first address is transferred from the input register in which it is stored, over bus 15 to pop-stack register 20. This is done by concurrently enabling the READ (A through C) output control lead of the one of registers 11, 12 or 13 in which the first address is stored and the LOAD E input control lead of pop-stack register 20. This causes the first address to be transferred via bus 15 to pop-stack register 20. Counter 21 is incremented by one in response to the first address being stored in register 20 and thereby indicates the storage of one address in register 20. The LOAD (A through C) input control lead of the one of input registers 11, 12 or 13 into which it is desired to store the second address is also enabled and the selected register stores the second address. This load operation may be concurrent with the transfer of the first address to pop stack register 20 to speed up the operation of buffer address register 10. At this point in time two addresses are stored in buffer address register 10.

Three possible courses of actions can now take place. First, if a third address is to be stored in one of registers 11, 12 or 13 before the first address and/or second address are read out, the operation described in the last paragraph is repeated and the second address is also stored in pop-stack register 20 along with the first address. Concurrently the third address is stored in a selected one of registers 11, 12 or 13. Second, the second address can be read out of the one of input registers 11, 12 or 13 in which it is stored to address output 23, as previously described, either before storage of the third address or concurrent therewith. The first address is still stored in pop-stack register 20. Third, due to the last-in, first out operation of buffer address register 10, the second address can be read out of the one of registers 11, 12 or 13 in which it is stored. Then the first address can be read out either before or concurrent with the third address being stored in one of registers 11, 12 or 13. The details of how these three courses of action are implemented are described in detail further in this specification. These three examples, which are described in detail hereinafter, adequately describe the loading and reading of buffer address register 10 so that any sequence of loading and reading operations may easily be determined by one skilled in the art.

As details of the operation of buffer address register 10 to implement the above mentioned three courses of action are being described in the following paragraphs, the operation of local register 14 in conjunction with pop-stack register 20 is the same in one regard so is first described here. After the second address or any other address is read out of one of registers 11, 12 or 13 in which it is stored, while the first address is stored in pop-stack register 20, buffer address register 10 prepares for an anticipated read operation. To do this it transfers the first (or latest stored) address from pop-stack register 20 to local register 14 by concurrently enabling the READ E output control lead of register 20 and the LOAD D input control lead of local register 20. If the next operation is a read operation, no time is wasted and the first address is read out by enabling the READ D output control lead of local register 14 which will place the first address on bus 15 and thence to address output 23. However, in the event that the next operation is a write operation instead, the first address is returned to pop-stack register 20 while another address is concurrently being stored in one of input registers 11, 12 or 13. This is done by concurrently enabling the LOAD (A through C) input control lead of a selected one of input registers 11, 12 or 13, enabling the READ D output control lead of local register 14, and enabling the LOAD E input control lead of pop-stack register 20.

Continuing with the first course of action mentioned two paragraphs above, when the third address is received before the first and second addresses are read out, the second address is transferred from the one of input registers 11, 12 or 13 in which it is stored to pop-stack register 20 along with the first address already stored therein. This is done by concurrently enabling the READ (A through C) output control lead of the register in which the second address is stored and the LOAD E input control lead of pop-stack register 20. The second address is thereby transferred via bus 15 to pop-stack register 20 and counter 21 is incremented. Concurrently therewith, or slightly thereafter, the third address is loaded into one of registers 11, 12 or 13 by enabling the LOAD (A through C) input control lead of the selected register. After the third address is read out of the one of input registers 11, 12 or 13 in which it is stored, the second address is transferred from pop-stack register 20 into local register 14 as described in the last paragraph in anticipation that the next operation will be a read operation.

With the second course of action mentioned above the second address can be read out of the one of registers 11, 12 or 13 in which it is stored onto address output 23 as previously described. Concurrently therewith the first address is transferred to local register 14 in anticipation of a subsequent read operation as previously described. When there is a load operation instead, the first address is returned to pop-stack register 20 and, concurrently therewith, the third address is loaded into one of input registers, both as previously described.

With the third course of action the second address is read out of the one of input registers 11, 12 or 13 in which it is stored, and the first address is transferred to local register 14, both as previously described. Then the first address is read out of local register 14 to address output 23 as previously described. Either thereafter, or concurrently therewith, the third address is stored in a selected one of the input registers 11, 12 or 13 as previously described. The enabling of the LOAD and READ control inputs to the registers to accomplish this has already been described.

Although not specifically described, a plurality of addresses loaded sequentially or non-sequentially into ones of input registers 11, 12 and 13 and not read out to address output 23 can be transferred to pop-stack register 20 for read out at a later time until sixteen addresses are stored in register 20. When sixteen addresses are stored in pop-stack register 20 there is an overflow indication on overflow/underflow indicator 31 that will cause transfer of the sixteen stored addresses to an overflow memory 38 as previously described.

In an alternative embodiment of the invention the most recent address stored in pop-stack register 20 need not be transferred back and forth between register 20 and local register 14 until it is read out to address output 23. Rather, it would initially be placed in local register 14 and remain there until read out to address output 23. This operation is feasible because there is no address on output 28 of local register 14 until its READ D output control lead is energized.

Control logic circuit 32 controls the operations of the other circuits in register 10 to achieve the results described above in this specification. Control logic circuit has control inputs 24 comprising PUSH A, PUSH B, LOAD I, PUSH I and POP. The first two inputs cause register 10 to store an address respectively present on the input of input A address register 11 and input B address register 12. The LOAD I register input causes register 13 to store an interrupt address. The PUSH I control input performs the rest of a normal push sequence using the previously loaded value in interrupt register 13. The POP input signal causes buffer address register 10 to read out the last stored address to address output 23. The operation of control logic circuit 32 to perform these tasks is better understood in the description of FIG. 3.

When pop-stack register 20 has sixteen addresses stored therein, following a PUSH operation, as indicated by a count of sixteen in its associated counter 21, there is an impending overflow indication on overflow-/underflow indicator lead 31 which is input to interrupt logic 46. There is an actual overflow if there is another PUSH operation without reading something out of register 10. In response to the impending overflow indication interrupt logic 46 generates an overflow sequence address which is preferentially applied via multiplexer 45 to control store 36 instead of an address from next address generator 43. The overflow sequence address causes the next operation of control store 36 to be a register overflow sequence. At the same time the address concurrently output from next address generator 35, responsive to an input other than from buffer address register 10, is not to be lost so it is temporarily stored in interrupt address register 13 of register 10 by applying the interrupted address output from next address generator 35 via address inputs 22 to input 18 of interrupt address register 13. Then interrupt logic 46 generates a LOAD I control signal (as part of control inputs 24) which is applied to control logic circuit 32 of buffer address register 10 in FIG. 2. Control logic 32 responds to the LOAD I control signal to energize LOAD C which enables interrupt address register 13 to store the interrupted address present at its input 18.

As part of the buffer overflow sequence generated by control store 36, a string of sixteen POP commands are applied to control logic 32 in buffer address register 10. Responsive thereto control logic 32 generates sixteen sets of commands to pop-stack register 20 and local register 14 to thereby sequentially read out the sixteen addresses stored in pop-stack register 20 via local register 14, bus 15 and address output 23. Each of the aforementioned sets of commands is LAD D and READ E followed by READ D. The sixteen addresses read out of pop-stack register 20 are transferred via bus 40 and stored in some external memory such as memory 38 as shown in FIG. 1. With this overflow operation buffer address register 10 has a somewhat infinite depth, limited only by the amount of external memory.

The buffer overflow sequence then applies the address of an underflow sequence to input 16 of input A address register 11 and generates a PUSH A command which loads the underflow sequence address into register 11. Next, a PUSH I command is applied to applied to control logic 32 which generates a READ A and a LOAD E which causes the underflow sequence address stored in input A address register 11 to be read out and stored pop stack register 20. The interrupt address is still stored in interrupt address register 13. Then a POP command is generated which causes control logic circuit 32 to generate READ C which causes the interrupt address to be read out of interrupt address register 13 to address output 23. This leaves only the underflow sequence address stored in pop stack register 20.

Subsequently, any combination of PUSH and POP commands may be executed to buffer address register 10 until the underflow sequence address is read out of pop stack register 20, leaving it empty of addresses. Responsive to the underflow sequence address being read out of register 10, it is sent via local register 14, bus 15, address output 23, next address generator 35, and multiplexer 45 to control store 36. Control store 36 responds thereto to sequentially retrieve each of the sixteen addresses previously transferred to memory 38 and return them to buffer address register 10. This is done by generating a sequence of control signals which sequentially reads each of the sixteen addresses out of memory 38 followed by a PUSH B command which passes them via input B address register 12 and bus 15 to be restored in pop-stack register 20. Thereafter, these addresses are retrieved from register 20 by POP command as previously described.

Figure 3:
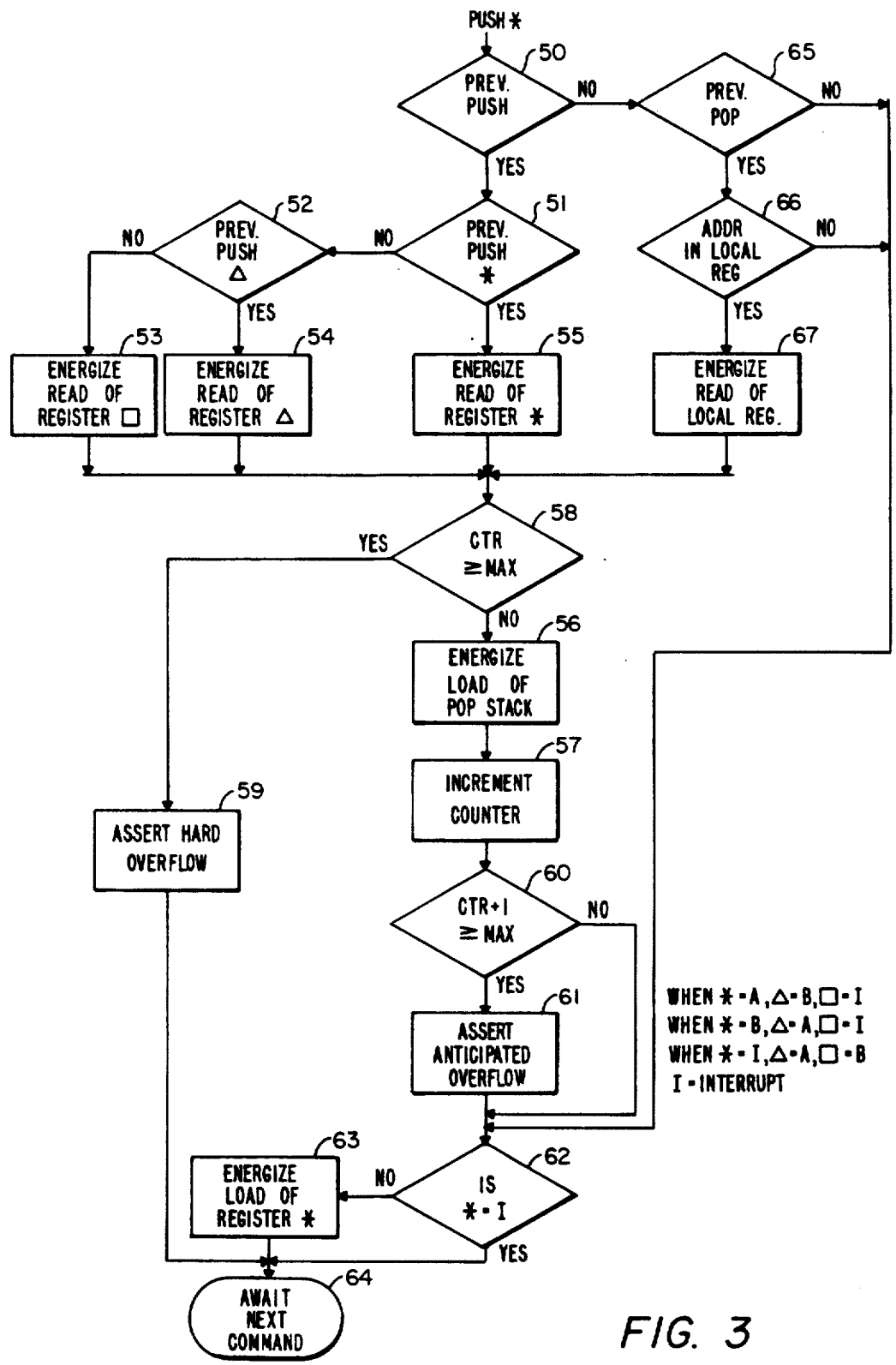
FIG. 3 is a logic diagram of the functions performed by a control logic circuit in the novel buffer address register for a PUSH command.

In FIG. 3 is shown a logic control diagram describing the operation of control logic circuit 32 in response to a PUSH command. The logic circuitry may be implemented by one skilled in the art from interconnected logic circuitry, by ROM in which is stored the logic, or by other techniques equally well known in the art.

The logic control diagram shown in FIG. 3 represents the logic for implementing PUSH A, PUSH B, or PUSH I (Interrupt) command signals that are part of control inputs 24 shown in FIG. 2. Since the logic is almost the same for all three PUSH commands, in FIG. 3 a short hand notation is used with an asterisk, triangle and square. The correlation of these short hand symbols with particular PUSH signals is given at the bottom of FIG. 3. For example, when it is desired to describe the operation for PUSH A, the asterisk throughout the blocks in FIG. 3 represents PUSH A and circuits associated with address input A, the triangle represents the circuits associated with address input B, and the square represents the circuits associated with the interrupt address input.

When a PUSH A command is given to control logic circuit 32, the logic first determines via decision block 50 if the previous command was a PUSH command. If the previous command was a PUSH command there is an address stored in one of address registers 11 through 13 that must first be read out and stored in pop-stack register 20. At decision blocks 51 and 52 the logic then checks to determine which register was previously PUSHed. When logic blocks 51 and 52 determine which address register has an address stored therein, the logic energizes the READ (A through C) input of the one of input address registers 11 through 13 which has the address stored therein as represented by blocks 53 through 55, and energizes the LOAD E input to pop-stack register 20 as shown by block 56 to thereby transfer the address to pop-stack register 20. Then address counter 21 is incremented via logic block 57.

The logic also checks at logic block 58 if the count in the counter equal to sixteen. If it is, the sixteen addresses stored in the pop stack register have not been transferred to memory 38 and there is an error since there is no room in pop stack register 20 to store another address. Such a condition causes an assertion of a hard overflow by block 59 which causes the contents of pop stack register 20 to be transferred to external memory 38 as previously described in this specification.

After the address is stored and the counter incremented, as mentioned above, the count in counter 21 plus one is checked at logic block 60 to see if it at least equals the maximum count of sixteen in pop stack register 20. This is an anticipated overflow condition. If the answer to this decision is yes, an anticipated overflow condition is asserted at logic block 61. If the decision is no, there is no anticipated overflow and the logic bypasses the anticipated overflow step.

The next decision made by the logic at block 62 is to determine if the initial PUSH is a PUSH I. If the answer is yes, then nothing more is done and the system awaits the next command. If the answer is no, at block 63 the logic energizes the LOAD lead for the address register for which the PUSH command was received and started the above described sequence to load an address at the input of this address register. The logic is then through with its sequence of operations responsive to the PUSH command and awaits the next command at block 64.

However, in the very beginning of the PUSH logic operations the initial determination is that the previous command was not a PUSH, as determined at logic block 50, logic block 65 then determines if the previous command was a POP command. If the answer is no it means that the system has just been enabled because there is no previous POP or PUSH command, and the logic exits to block 62 which is described in the last paragraph. If, alternatively, the answer to this decision is yes, the logic goes to block 66 and determines if there is an address in the local register waiting for a POP operation to read it out. Upon there being no address in the local register the logic exits to block 62 described in the last paragraph, but if the answer is yes the logic goes to block 67 and energizes READ D to read out the contents thereof. The logic then has to restore the address just read out of the local register and the logic steps described above are performed.

PUSH I and LOAD I are separate control commands so that the handling of the pop stack overflow as an interrupt is possible without losing any addresses stored in buffer address register 10.

Figure 4:
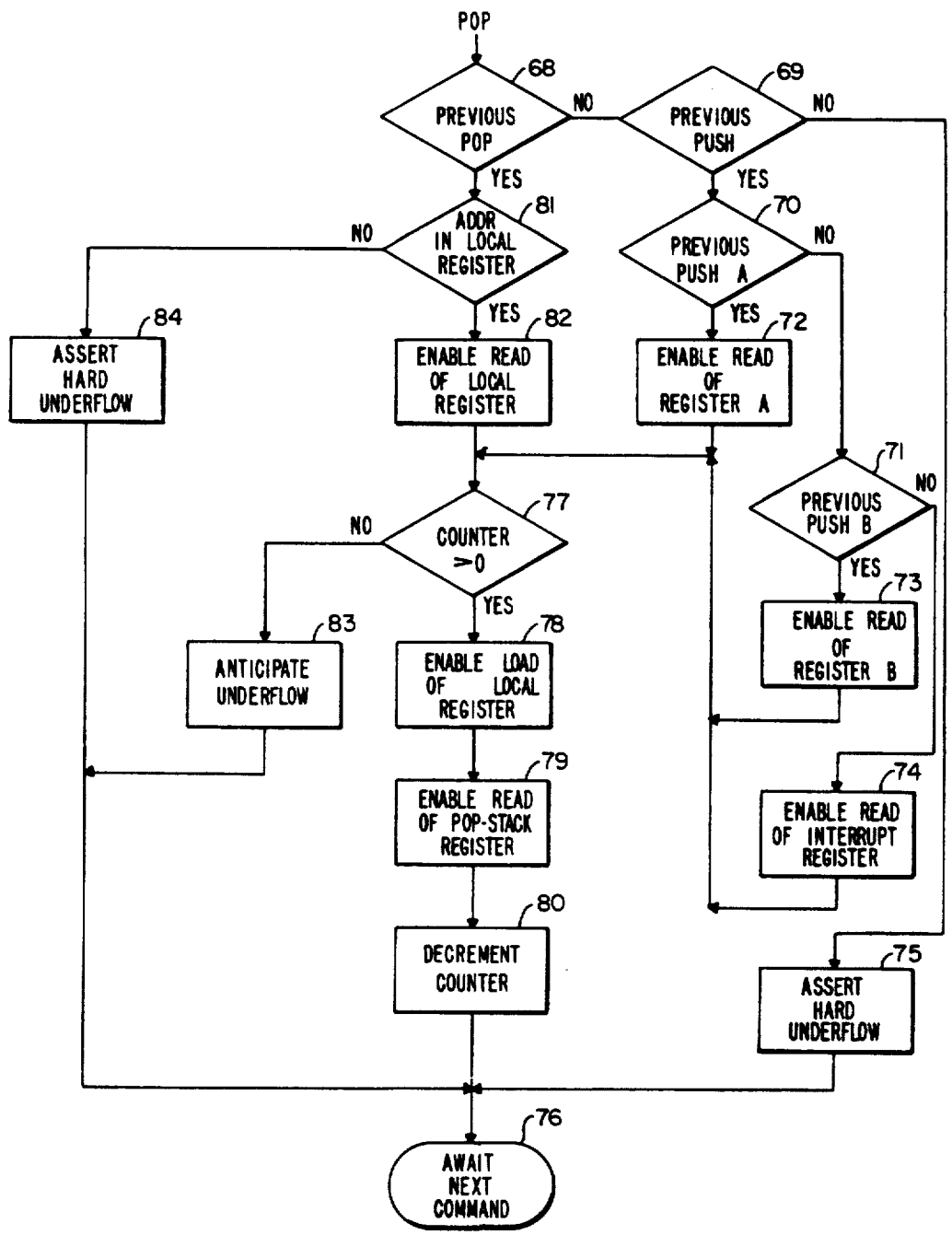
FIG. 4 is a logic diagram of the functions performed by the control logic circuit in the novel buffer address register for a POP command.

In FIG. 4 is shown a logic control diagram describing the operation of control logic circuit 32 to implement a POP operation in the novel buffer address register 10. In response to a POP command the logic first determines if the previous command was a POP command as represented by logic block 68. If the answer to that decision is a no, logic blocks 69 through 71 determine if the previous command was a PUSH, and if so, if the previous command was a PUSH A, PUSH B, or a PUSH I command. Whichever is the case, if the previous command was a PUSH, a command is then given by the appropriate one of logic blocks 72 through 74 to enable the READ (A through C) input of the one of registers 11 through 13 in which there is stored an address to read out the address onto output 23 via bus 15. Now there is no address stored in any of address registers 11 through 13.

If the decision at block 69 is no that the previous operation was not a PUSH, the system has apparently just started up so there should be no POP operation since there are no addresses stored in register 10. Accordingly, the logic does not continue with a POP operation but instead goes to block 75 and asserts a hard underflow because something is wrong and exits to logic block 76 to await the next command.

After the logic has read an address out of one the address registers A through C via one of logic blocks 72 through 74, the logic goes to logic decision block 77 to determine if the count in counter 21 is greater than zero which indicates that there are one or more addresses stored in pop-stack register 20. If the answer is yes, the last-in address stored in pop-stack register 20 is transferred to local register 14 in anticipation that the next command will be a POP command by concurrently energizing LOAD D to local register 14 and READ E to pop-stack register 20 per logic blocks 78 and 79. With an address transferred from pop-stack register 20 to local register 14, logic block 80 concurrently decrements counter 21 by one. The logic now awaits a next command as shown as logic block 76.

If the decision at logic block 68 is yes, the previous command was a POP, there are no addresses stored in input address registers 11 through 13, so logic block 80 determines if there is an address stored in local register 14 awaiting an anticipated POP operation. If there is an address stored in local register 14, logic block 82 energizes the READ D input of local register 14 to read out the address stored therein to address output 23. Thereafter, logic block 70 goes to logic block 77 to determine if there are any addresses stored in pop stack 10 as has been described above. If, however, the decision at block 77 i no that the count in counter 21 is equal to zero, indicating that there are no more addresses stored in the counter, another POP command cannot validly follow since there are no addresses now stored in buffer address register 10, so the logic exits to logic block 83 to assert an anticipated underflow. This is followed by the logic going to block 76 to await the next command.

Back at logic block 81, if the decision is alternatively no that there is no address stored in local register 14, there is a problem since if the previous operation is a POP there are no addresses stored either in address registers 11 through 13 or in register 14. The system cannot read out an address when there are none stored in register 10. Thus, the logic goes to block 84 to assert a hard underflow and then goes to block 76 to await the next command without executing any other steps of a POP command.

While what has been described above is the preferred embodiment of the invention, it will be obvious to those skilled in the art that many changes may be made without departing from the spirit and scope of the invention. For example, the number of input registers, such as registers 11, 12, and 13 may be increased or decreased, and the number of addresses stored in pop-stack register 20 may be changed. Also, addresses can be stored in more than one of input registers 11, 12 or 13 at the same time.

What is claimed is:

1. A buffer address register for storing multiple-bit addresses from a plurality of multiple-bit address sources and for re-delivering said addresses to a common address output on a last-in, first-out basis, said buffer address register comprising, in combination,
   - a plurality of multiple-bit local input registers each having an input connected to one of said plurality of address sources and each having an output connected to said common address output,
   - a local multiple-bit stack-output register having an input and having an output directly connected to said common address output,
   - a pop-stack register having plural multiple-bit storage locations, having an input connected to said common address output, and having an output connected to the input of said local stack-output register, and
   - control logic responsive to a command to push a new address from one of said plurality of address sources address for transferring any previously pushed address stored in one of said local input registers to the input of said pop-stack register via said common address output and for thereafter storing said new address in one of said local input registers.

2. A buffer address register as set forth in claim 1 wherein said pop-stack register includes a counter whose contents specify one of said plural storage locations, means for incrementing said counter each time an address is pushed into said pop-stack register via said common address output, means responsive to said counter being incremented beyond a predetermined count for generating an overflow interrupt, and means responsive to said overflow interrupt for transferring addresses from said pop-stack register to an external memory.

3. A buffer address register as set forth in claim 2 further including means for decrementing said counter each time an address is popped from said stack register, and means responsive to said counter being decremented below a second predetermined value for restoring said transferred addresses to said pop-stack register.

4. A buffer address register as set forth in claim 3 wherein said means for restoring addresses to said pop-stack register comprises program-controlled processor means for executing an underflow condition-handling-routine whose first instruction is stored at an entry point address in said external memory, and wherein said means responsive to said overflow interrupt first transfers addresses from said pop-stack register to said external memory and then pushes said entry point address into said pop-stack register for execution in response to said counter being decremented below said second predetermined value.

* * * * *